US010826598B1

(12) United States Patent
Weiner et al.

(10) Patent No.: US 10,826,598 B1
(45) Date of Patent: Nov. 3, 2020

(54) SATELLITE COMMUNICATION SYSTEM HAVING MITIGATION ACTION FOR RAIN FADE AND ASSOCIATED METHOD (71) Applicant: EAGLE TECHNOLOGY, LLC, Melbourne, FL (US)

(72) Inventors: Allan M. Weiner, Melbourne, FL (US); Brian L. Barnes, Satellite Beach, FL (US); Leslie C. Spain, Palm Bay, FL (US); Brian J. Haman, Melbourne, FL (US); Matthew P. Wilson, West Melbourne, FL (US); Matthew T. Lysaught, Orlando, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 16/507,120

(22) Filed: Jul. 10, 2019

(51) Int. Cl.
*H04B 7/185* (2006.01)
*G01W 1/14* (2006.01)

(52) U.S. Cl.
CPC .......... *H04B 7/18513* (2013.01); *G01W 1/14* (2013.01); *H04B 7/18523* (2013.01); *H04B 7/18543* (2013.01)

(58) Field of Classification Search
CPC .................................................. H04B 7/18513
See application file for complete search history.

(56) References Cited

U.S. PATENT DOCUMENTS

| | | | | | |
|---|---|---|---|---|---|
| 4,301,533 A | * | 11/1981 | Acampora | ................ | H04L 1/22 370/318 |
| 4,309,764 A | * | 1/1982 | Acampora | ......... | H04B 7/18513 370/318 |
| 4,495,619 A | * | 1/1985 | Acampora | ............. | H04B 7/212 370/207 |
| 4,896,369 A | * | 1/1990 | Adams, Jr. | ......... | H04B 7/18513 455/10 |
| 4,941,199 A | * | 7/1990 | Saam | ................. | H04B 7/18543 455/10 |

(Continued)

FOREIGN PATENT DOCUMENTS

WO    1998018214    4/1998

OTHER PUBLICATIONS

Phil Charlesworth, "Rain Fade Calculations," University of Wales (Newport) Lectures, Miscellaneous Course Notes, Rain Fade—Notes on a Technique to Estimate Rain Margins, www.philsrockets.org.uk/Rain%20Fades.pdf, Apr. 1, 2015, pp. 1-4.

(Continued)

*Primary Examiner* — Ankur Jain
(74) *Attorney, Agent, or Firm* — Allen, Dyer, Doppelt + Gilchrist, P.A.

(57) ABSTRACT

A satellite communication system may include a terrestrial station and a satellite having a communication link therebetween. The terrestrial station may include a controller and a transceiver cooperating therewith and configured to determine a degradation of the communication link, obtain satellite-derived, rainfall rate and rainfall height data, and determine a rain fade for the communication link based upon the satellite-derived, rainfall rate and rainfall height data. When the degradation of the communication link is caused by the rain fade, the controller determines a mitigation action for the satellite and communicates the mitigation action to the satellite.

26 Claims, 3 Drawing Sheets

(56) References Cited

U.S. PATENT DOCUMENTS

| | | | | |
|---|---|---|---|---|
| 5,231,668 | A * | 7/1993 | Kravitz | H04L 9/3013 380/28 |
| 5,511,079 | A * | 4/1996 | Dillon | H04B 7/18519 714/774 |
| 6,226,525 | B1 * | 5/2001 | Boch | H04W 52/143 455/504 |
| 6,307,833 | B1 * | 10/2001 | Barker | H04B 7/022 370/216 |
| 6,985,458 | B2 * | 1/2006 | Freedman | H04B 7/1858 370/321 |
| 7,643,827 | B1 * | 1/2010 | Kiesling | H01Q 19/17 455/427 |
| 7,656,825 | B2 * | 2/2010 | Stanwood | H04B 7/2621 370/275 |
| 7,706,486 | B2 * | 4/2010 | Strodtbeck | H04L 1/06 375/349 |
| 7,965,661 | B2 | 6/2011 | Stanwood | |
| 8,023,489 | B2 * | 9/2011 | Schiff | H04B 7/1858 370/345 |
| 8,385,817 | B2 * | 2/2013 | Dankberg | H04B 7/2041 455/10 |
| 8,897,207 | B2 * | 11/2014 | Argov | H04B 7/1858 370/317 |
| 9,432,161 | B2 * | 8/2016 | Esserman | H04B 7/18517 |
| 9,581,727 | B1 * | 2/2017 | Weiner | G01W 1/10 |
| 9,621,257 | B2 * | 4/2017 | O'Neill | H04B 7/2041 |
| 9,882,630 | B2 * | 1/2018 | Jalali | H04B 7/18508 |
| 10,278,133 | B2 | 4/2019 | Ravishankar | |
| 2003/0054816 | A1 * | 3/2003 | Krebs | H04B 7/18582 455/428 |
| 2016/0242066 | A1 * | 8/2016 | Ryu | H04B 7/18513 |
| 2018/0160373 | A1 * | 6/2018 | Ravishankar | H04B 7/18543 |
| 2019/0081697 | A1 * | 3/2019 | Wyler | H04B 17/373 |

OTHER PUBLICATIONS

Jena et al., "Rain Fade Calculation and Power Compensation for Ka-Band Spot Beam Satellite Communication in India," Meghanathan et al. (Eds.): C Advances in Networks and Communications, CSIT 2011, Communications in Computer and Information Science, vol. 132, pp. 313-320.

Jayadev Jena, "A Study of Rain Attenuation Calculation and Strategic Power Control for Ka-Band Satellite Communication in India," Thesis Paper, Department of Electrical Engineering National Institute of Technology, Rourkela, India, 2012, pp. 1-117.

RF Toolbox, retrieved from internet: https://apps.apple.com/ae/app/id320704516, Jul. 30, 2019, pp. 1-2.

Giannetti et al., "Real-Time Rain Rate Evaluation via Satellite Downlink Signal Attenuation Measurement," Sensors (Basel) v.17(8); PMC5580102, Aug. 2017, pp. 1-34.

Patra et al., "Frequency Diversity Improvement Factor for Rain Fade Mitigation Technique for 50-90 Ghz in Tropical Region," 2017 8th Annual Industrial Automation and Electromechanical Engineering Conference (IEMECON), Aug. 2017, pp. 86-90.

Dao et al., "Preliminary Analysis of Ku-Band Rain Fade Data for Earth-to-Satellite Path Measured in Malaysia.," 2011 IEEE 10th Malaysia International Conference on Communications, Oct. 2-5, 2011, pp. 93-96.

Huang et al., "Simulation Results of Real Time Rain Fade Detection & Fade Depth Estimation," Conference: 18th International Communications Satellite Systems Conference and Exhibit, Apr. 2000, p. 1. Abstract.

Robert M. Manning, "Statistical Rain Attenuation Prediction Model With Application to the Advanced Communication Technology Satellite Project; II—Theoretical Development of a Dynamic Model and Application to Rain Fade Durations and Tolerable Control Delays for Fade Countermeasures." NASA Technical Memorandum 100242, Dec. 1987, pp. 1-101.

Rafiqul et al., "Frequency Diversity Improvement Factor for Rain Fade Mitigation in Malaysia," 2015 IEEE International WIE Conference on Electrical and Computer Engineering (WIECON-ECE), Dec. 19-20, 2015, pp. 159-163.

Shalkhauser et al., "Rain-Fade Simulation and Power Augmentation for Satellite Communication Systems," NASA Technical Memorandum 103134, Sep. 1990, pp. 1-12.

* cited by examiner

SATELLITE COMMUNICATION SYSTEM HAVING MITIGATION ACTION FOR RAIN FADE AND ASSOCIATED METHOD

FIELD OF THE INVENTION

The present invention relates to a satellite communication system and, more particularly, to determining a mitigation action when a communication link between a satellite and terrestrial station is degraded by rain fade and related methods.

BACKGROUND OF THE INVENTION

A satellite communication system may include a terrestrial station and a satellite having a communication link therebetween, allowing communications data to be transmitted between the terrestrial station and the satellite. The quality of this communication link depends on several factors, including the type of antennas used at the terrestrial station and on the satellite, the signal power transmitted from the satellite, the gain of the antennas, the output power at the terrestrial station, and the position of the terrestrial station relative to the radiation footprint of the satellite. Another factor that may affect the communication link is the atmospheric condition, for example, water in the form of clouds, vapors, rain, hail, or snow that exists in the signal path at the time of signal transmission. This phenomenon is known as rain fade, regardless if the attenuation is caused by rain or other forms of moisture and water, e.g., snow.

The signal attenuation caused by rain fade is more pronounced at the higher frequencies, and thus depends on the frequency band, for example, C-band, Ku-band, Ka-band, or other bands. The higher the frequency, usually the deeper the rain fade being experienced for a given level of rain intensity. The rain fade problem is especially relevant at signal frequencies above 10 GHz, and the problem is exacerbated as the signal frequency increases. In some cases, it may not be raining at the location of the terrestrial station for a signal to be affected by rain fade because the signal may pass through precipitation many miles away, especially when the terrestrial station antenna is at a low elevation angle.

Usually, signal power can be increased on the uplink from the terrestrial station to the satellite with little difficulty, but increasing the signal power on the downlink from the satellite is more difficult because the satellite is limited in the amount of signal power it can generate since there may be limited battery power and a limited recharge power that solar panels carried by the satellite can generate. Additionally, since a terrestrial station may not even be located in an area where it is raining, but still subject to rain fade, it is sometimes difficult to know when degradation of the communication link is caused by rain fade. There may be other factors causing signal degradation, such as intentional jamming, LTE interference, accidental electrostatic discharge, and other technical problems causing signal degradation.

Some satellite communication systems calculate rain fade in a delayed time period using weather data obtained from geostationary or low Earth orbiting (LEO) satellites. Past weather data is processed to calculate rain fade, usually a few hours after the rain event to determine potential future actions. Some systems have even used rain gauges in conjunction with weather observations to determine rain fade. This type of rain fade data, however, was not available on a near real-time basis and any rain fade calculations and conclusions were obtained many hours to days after the rain event.

SUMMARY OF THE INVENTION

In general, a satellite communication system may include a terrestrial station and a satellite having a communication link therebetween. The terrestrial station may include a controller and a transceiver cooperating therewith and configured to determine a degradation of the communication link, obtain satellite-derived, rainfall rate and rainfall height data, and determine a rain fade for the communication link based upon the satellite-derived, rainfall rate and rainfall height data. The controller is also configured to determine when the degradation of the communication link is caused by the rain fade, and determine a mitigation action for the satellite and communicate the mitigation action to the satellite when the degradation of the communication link is determined to be caused by the rain fade.

The controller may be configured to generate an indication when the degradation of the communication link is not caused by the rain fade. The controller may also be configured to determine an ending of the degradation of the communication link, and communicate a return-to-normal action for the satellite based upon an ending of the degradation of the communication link. The controller may be configured to determine the degradation of the communication link based upon a reduced received signal strength, for example.

In some embodiments, the mitigation action may include increasing a transmit power of the satellite. The mitigation action may also include establishing an alternative communication link with a back-up terrestrial station. The controller may be configured to determine the back-up terrestrial station based upon the satellite-derived, rainfall rate and rainfall height. The mitigation action may include establishing an alternative communication link in a different frequency band from the communication link. Another mitigation action is to use the same terrestrial station and an alternative satellite not in the rain fade line. The controller may be configured to determine the rain fade using a rain fade model.

Another aspect is directed to a method for operating a satellite communication system that may include a terrestrial station and a satellite having a communication link therebetween. The terrestrial station may include a controller and transceiver cooperating therewith. The method includes operating the controller and the transceiver cooperating therewith to determine a degradation of the communication link, obtain satellite-derived, rainfall rate and rainfall height data, and determine a rain fade for the communication link based upon the satellite-derived, rainfall rate and rainfall height data. The controller is also operated to determine when the degradation of the communication link is caused by the rain fade, and determine a mitigation action for the satellite and communicate the mitigation action to the satellite when the degradation of the communication link is determined to be caused by the rain fade.

BRIEF DESCRIPTION OF THE DRAWINGS

Other objects, features and advantages of the present embodiments will become apparent from the detailed description which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout.

Figure 1:
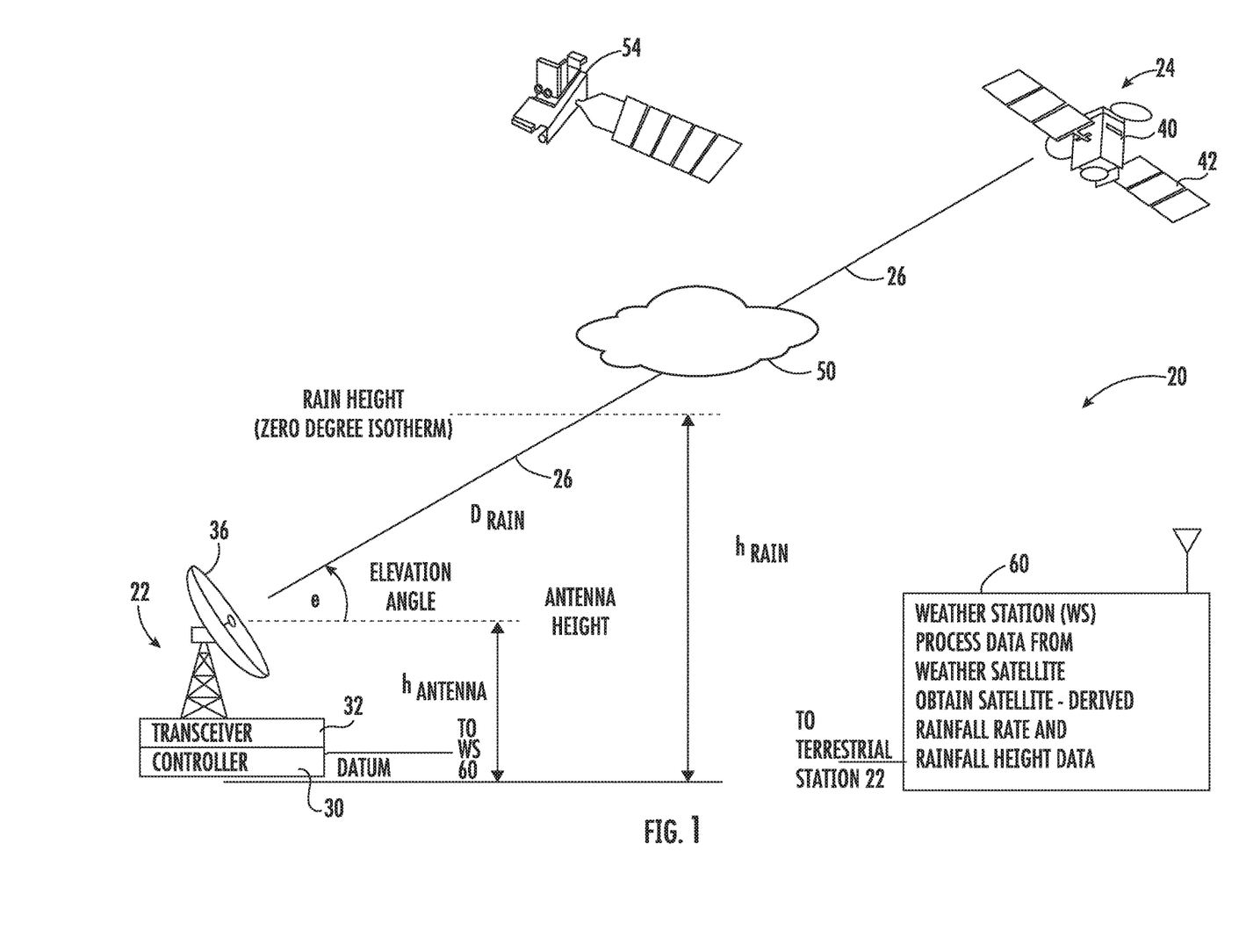
FIG. 1 is a general environmental view of the satellite communication system showing the terrestrial station and satellite and communication link subject to rain fade.

Referring initially to FIG. 1, a satellite communications system is illustrated generally at 20 and includes a terrestrial station 22 and a communications satellite 24 having a communication link therebetween, as illustrated by the line 26 extending between the terrestrial station and communications satellite. The terrestrial station 22 includes a controller 30 and a transceiver 32 cooperating therewith. The terrestrial station 22 also includes an antenna 36, which may be a dish antenna, and has an elevation angle (e) relative to the horizontal and a height ($h_{ANTENNA}$) corresponding usually to the altitude of the terrestrial station 22 in kilometers. The satellite 24 may be in a geostationary orbit about 22,000 miles above the Earth's equator as is typical for many communications satellites, and following the direction of Earth's rotation. The antenna 36 at the terrestrial station is directed at the satellite, and thus, has a specific elevation angle (e).

The satellite 24 includes a satellite housing 40 and a satellite transceiver and associated electronic components (not shown) carried by the satellite housing 40. Solar panels 42 provide power to internal batteries for charging the batteries and operating any electronic components carried by the satellite 24. In an example, it is possible that the satellite 24 may be a small form factor satellite, such as formed by one or more CubeSats, allowing the satellite transceiver and any associated electronic components and circuits to be formed from conventional off-the-shelf (COTS) components as is typical for those smaller satellites formed from CubeSats. The terrestrial station 22 is located at a specific latitude and longitude that is usually known to within a second and minute of a degree and at a specific altitude, a range of frequency of operation, a signal polarization, and a required or known signal availability.

As illustrated in the example of FIG. 1, a cloud front is designated generally at 50 and includes some type of precipitation or atmospheric vapor or water that exists between the terrestrial station and satellite 24, which in this example, causes a degradation in the communication link 26 due to rain fade. The terrestrial station 22 may determine an initial degradation of the communication link 26, such as by loss of signal power from the satellite 24 over the communication link 26, but at this time, the terrestrial station may not be able to determine whether the initial degradation of the communication link is caused by rain fade or for some other reason, for example, intentional jamming, LTE interference, a nearby accidental electrostatic discharge, or for some other technical reason that could also potentially cause a degradation in the communication link between the terrestrial station 22 and satellite 24.

It is possible to determine in near real-time, e.g., within 5 to 15 minutes of the rain fade event, the rain fade causing RF signal attenuation, such as when the terrestrial station 22 has determined there is a degradation of the communication link 26. The controller 30 is configured to determine the rain fade as the rain loss, for example, in decibels, using a rain fade model, including use of ITU rain fade equations, where the satellite-derived, rainfall rate data may be in millimeters per hour, and rainfall height data ($hiu_{uN}$ in FIG. 1), may be the rain height in kilometers with a zero degree isotherm. This data may be acquired directly from a weather satellite illustrated generally at 54 and orbiting in Low Earth Orbit (LEO), for example, or at a higher orbit, such as in a geostationary orbit. This rainfall rate and rainfall height data could also be obtained from a ground weather station 60 that processes the data received from a weather satellite 54 and determines the satellite-derived rainfall rate and rainfall height data. The weather station 60 and terrestrial station 22 may be in communication with each other using a communication channel known to those skilled in the art. The controller 30 may determine the rain fade in the communication link 26 based upon the satellite-derived rainfall rate and rainfall height data using the known rain fade equations established by the International Telecommunication Union (ITU). The terrestrial station 22 has a known elevation angle (e) and antenna height ($h_{ANTENNA}$), e.g., altitude in kilometers relative to a datum as illustrated in FIG. 1. The path length of the communication link 26 through the atmosphere is indicated as $D_{RAIN}$ in FIG. 1.

A modern weather satellite 54 may provide near real-time data as the satellite-derived rainfall rate and rainfall height data and transmit that data to a weather station or directly to the terrestrial station 22 where its controller 30 may process the data. Additionally, the weather satellite 54 may process data to determine the rainfall rate and rainfall height data at a specific location, such as the location where the terrestrial station 22 is located or at the area where the signal is propagated and subject to rain fade. The weather station 60 itself can receive large quantities of weather data and process that data to determine the rainfall rate and rainfall height data for a specific geographical area and transmit that data to the controller 30. As noted before, the terrestrial station 22 includes an antenna 36 and transceiver 32 that may transmit and receive RF signals at a specific vertical and horizontal polarizations. Coefficients related to horizontal and vertical polarizations used in rain fade calculations relative to signal frequency are noted in Table 1.

The International Telecommunications Union (ITU) standard for rain fade may be calculated when the height of rain and the rain rate is known, and other known factors as shown in FIG. 1. With modern weather satellites, it is possible to obtain and calculate rain fade based satellite-derived rainfall rate and rainfall height data on a near real-time basis, e.g., 5 to 15 minutes. The rain fade equation is:

$$L_{RAIN} = \gamma R \, D_{RAIN}$$

Where:
$L_{RAIN}$ is the rain loss in dB
$\gamma R$ is the specific attenuation (dB/Km)
$D_{RAIN}$ is the path length through the troposphere in Km $$\gamma_R = \text{specific attenuation (dB/Km)} = KR^\alpha$$

K=Coefficient (see Table 1)
R=Rain rate (mm/hr)
α=Coefficient (see Table 1)

$$D_{rain}=\text{path length (Km)}=(h_{rain}-h_{antenna})/\sin(e)$$

$h_{rain}$=Rain height (Km) (zero degree isotherm)
$h_{antenna}$=Antenna height (Km)
e=Antenna elevation angle (degrees)

TABLE 1

| Frequency | Horizontal polarisation | | Vertical polarisation | |
|---|---|---|---|---|
| GHz | K | α | K | α |
| 1 | 0.0000387 | 0.912 | 0.0000352 | 0.880 |
| 2 | 0.000154 | 0.963 | 0.000138 | 0.923 |
| 4 | 0.000650 | 1.121 | 0.000591 | 1.075 |
| 6 | 0.00175 | 1.308 | 0.00155 | 1.265 |
| 7 | 0.00301 | 1.332 | 0.00265 | 1.312 |
| 8 | 0.00454 | 1.327 | 0.00395 | 1.310 |
| 10 | 0.0101 | 1.276 | 0.00887 | 1.264 |
| 12 | 0.0188 | 1.217 | 0.0168 | 1.200 |
| 15 | 0.0367 | 1.154 | 0.0335 | 1.128 |
| 20 | 0.0751 | 1.099 | 0.0601 | 1.065 |
| 25 | 0.124 | 1.061 | 0.113 | 1.030 |
| 30 | 0.187 | 1.021 | 0.167 | 1.000 |
| 35 | 0.263 | 0.979 | 0.233 | 0.963 |
| 40 | 0.350 | 0.939 | 0.310 | 0.929 |

The controller 30 at the terrestrial station 22 either processes data obtained from the weather satellite 54 or obtains the satellite-derived, rainfall rate and rainfall height data from the ground weather station 60, and from that data determines the rain fade for the communication link 26 based upon this satellite-derived, rainfall rate and rainfall height data, and determines when the degradation of the communication link is caused by the rain fade. If there is a degradation in the communication link 26 due to rain fade, the controller 30 determines a mitigation action for the satellite 24 and communicates this mitigation action to the satellite when the degradation of the communication link is determined to be caused by rain fade. If the degradation of the communication link 26 is not caused by rain fade, however, the controller 30 may be configured to generate an indication, which could be an alarm or other signal that may indicate an operator at the terrestrial station 22 should investigate causes of signal degeneration or perhaps the indication may initiate a diagnostic program or other maintenance program to look for other causes of signal degradation, such as intentional jamming, LTE interference, nearby accidental electrostatic discharge, or other technical reasons why there is signal degradation.

The mitigation action at the controller 30 could be a signal transmitted to the satellite 24 to increase the transmit power of the satellite or establish an alternative communications link 26 with a back-up terrestrial station that may be based upon the satellite-derived, rainfall rate and rainfall height. The mitigation action could also establish an alternative communication link 26 at a different frequency band from the frequency on the original communication link. When the controller 30 at the terrestrial station 22 determines an ending of the degradation of the communication link 26, it is possible to communicate a return-to-normal action to the satellite 24 based on that ending of the degradation of the communication link. For example, once the degradation based on rain fade in the communication link 26 ends and the rain fade is either gone or reduced to a minimum amount, the transmit power from the satellite 24 may be reduced back to a normal transmit power to save battery power. Another alternative mitigation action is to use the same terrestrial station and an alternative satellite not in the rain fade line as in a communication link 26.

The standard RF rain fade equations may be used with the weather data obtained from new geostationary and low Earth orbiting (LEO) weather satellites 54, such as but not limited to, United States geostationary satellites, for example, GOES-East and GOES-West weather satellites, the Japanese weather satellite Himawari, the Korean satellite KOMSAT, the European Meteosat weather satellite, and the low Earth orbiting (LEO) Joint Polar Satellite System (JPSS). The geostationary weather satellite 54 such as the GOES-East and GOES-West, will obtain weather data over a very large, fixed area of the Earth's surface, such as the North American continent, and obtain rainfall rate and height data. The LEO weather satellites may be used to determine the rainfall rate and height data when they are temporally and spatially coincident with the rain fade, and more likely in the higher latitudes than in the lower latitudes. Both the geostationary and LEO satellites have technologically new generation improvements, including higher temporal, spatial and spectral resolution of various sensors that allow for rain geolocation and height to determine within 5-15 minutes nominally and within seconds on some occasions, the rainfall height and rate data that are used in the ITU rain fade equations.

As noted before, weather satellites 54 may be polar orbiting or geostationary. Polar orbiting satellites may include north-south orbits in an example and observe the same spot on the earth twice daily, once during the daylight and once at night. Polar orbiting satellites may provide imagery and atmospheric soundings of temperature and moisture data over the entire Earth over a period of time as the Earth rotates each day. The geostationary weather satellites, on the other hand, are in orbit about 22,000 miles above the equator and spin at the same rate of the Earth and constantly focus on the same area. Thus, a geostationary satellite may take an image of the Earth at the same location every 5 to 15 minutes, for example, with on-board processing of the data creating what is in effect "movie loops" of the weather data that forecasters may use as their real-time "bird's eye view" of the weather. The two primary US geostationary satellites are GOES-East and GOES-West, and each satellite views almost one-third of the Earth's surface. One satellite monitors North America and South America and the Atlantic Ocean, and the other satellite monitors North America and the Pacific Ocean basin. The GOES-East satellite is positioned at 75.2 W longitude and the equator, and the GOES-West satellite is positioned at 135 W. longitude and the equator. These two geostationary satellites operate together to produce the full-faced picture of the Earth, day and night. Data from other geostationary weather satellites may be obtained, however, making rain fade determinations and its effect on signal degradation even more accurate.

The GOES weather satellites include an imager and sounder. The imager is a multichannel instrument that senses radiant energy and reflected solar energy from the Earth's surface and atmosphere. The sounder provides data to determine the vertical temperature and moisture profile of the atmosphere, and surface and cloud temperatures. Thus, it is possible to obtain the satellite-derived rainfall rate and rainfall height data that may be processed and used at the controller 30 of the terrestrial station 22 to determine a rain fade for the communication link 26 based on the satellite-derived rainfall rate and rainfall height data and determine when the degradation of the communication link 26 is caused by the rain fade to determine a mitigation action.

In an example, the GOES imager may be a sixteen channel instrument having four visible and twelve infrared channels that may sense the radiant and solar reflected energy from sampled areas of the Earth. The sounder uses imaging channels to sense specific data parameters for atmospheric temperature and moisture profiles, and surface and cloud temperature.

Other weather satellites 54 besides geostationary satellites that may be used to obtain weather data and the satellite-derived, rainfall rate and rainfall height data may include the satellites of the Joint Polar Satellite System (JPSS) as polar-orbiting environmental weather satellites, which usually make nearly polar orbits 14 times a day about 520 miles above the surface of the Earth, which may be considered LEO to mid-Earth orbit (MEO). The Earth rotates and allows these satellites to view a different part of the Earth and each orbit and each satellite may provide two complete views of weather around the world each day. Different instruments are carried by these polar-orbiting satellites, including a Visible Infrared Imaging Radiometer Suite (VI-IRS) instrument and the combination Advanced Technology Microwave Sounder (ATMS)/Cross-tracker Infrared Sounder (CrIS) instruments. There may also be an advanced Ozone Mapping and Profiler Suite (OMPS) and Clouds and Earth Radiant Energy System (CERES) instruments. These instruments provide visible, infrared and microwave data that can be used for cloud and precipitation monitoring, determination of surface properties and humidity profiles, and thus, determine the rainfall rate and rainfall height data used in the ITU rain fade calculation.

Figure 2:
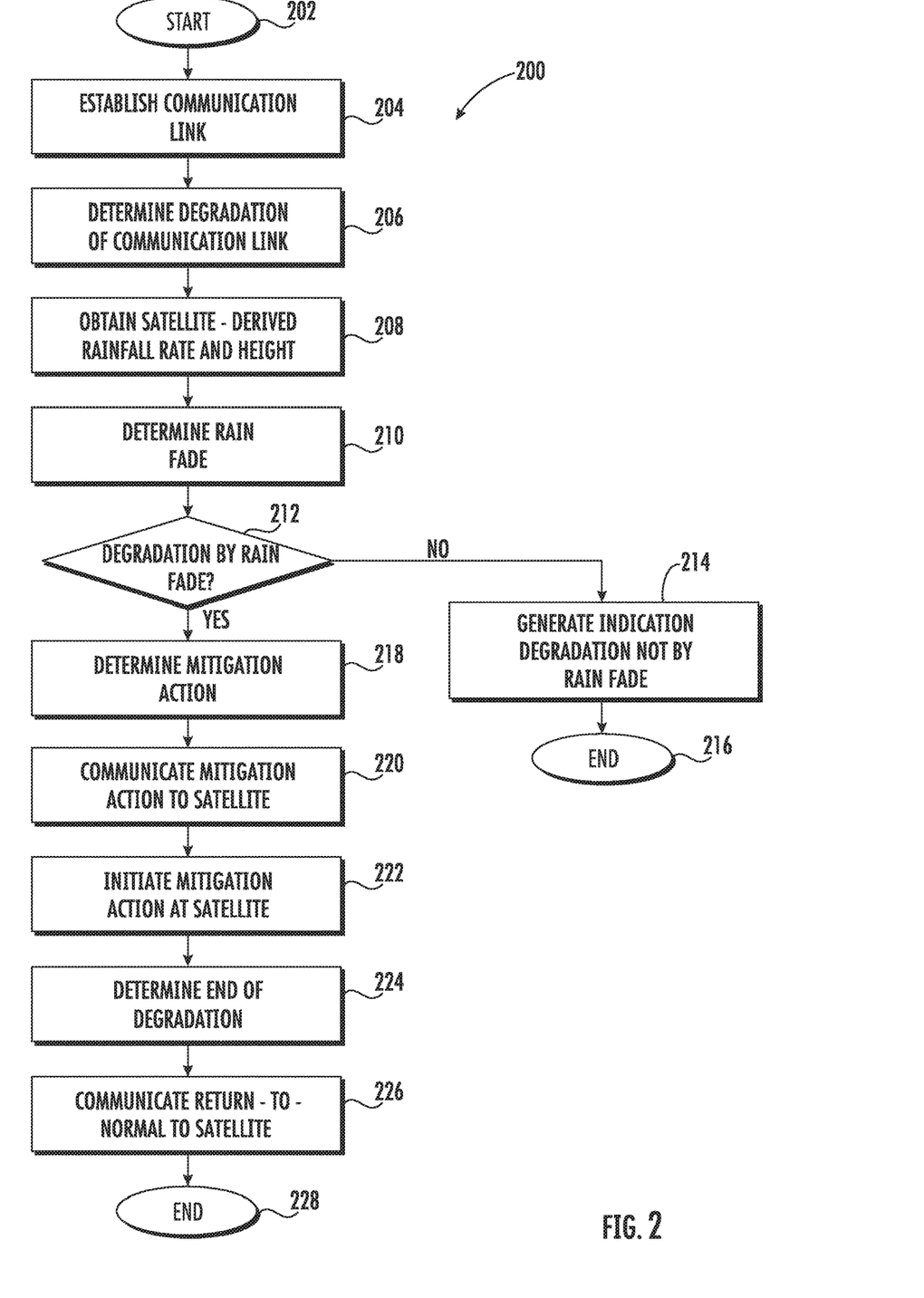
FIG. 2 is a high level flowchart of a method for operating the satellite communication system of FIG. 1 and determining a mitigation action for rain fade.

Referring now to FIG. 2, there is illustrated a flowchart showing a sequence of steps that may be used for operating the satellite communications system 20 as illustrated in FIG. 1 and with the method indicated generally at 200.

The process starts (Block 202) and the terrestrial station 22 establishes the communication link 26 with the satellite 24 (Block 204). The terrestrial station 22 determines the degradation of the communication link 26 (Block 206) such as when the controller 30 determines the degradation of the communication link 26 based upon a reduced received signal strength as when the communication signal begins to pass through the beginning of a rain storm or cloud front and becomes subject to rain fade. The controller 30 obtains the satellite-derived, rainfall rate and rainfall height data (Block 208) and determines the rain fade for the communication link 26 based upon that satellite-derived, rainfall rate and rainfall height data (Block 210).

The controller 30 determines if the degradation of the communication link 26 is caused by rain fade (Block 212), and if not, as indicated by the "NO" from Block 212, the controller may generate an indication that the degradation is not caused by rain fade (Block 214). At this time, for example, the indication may cause an operator at the terrestrial station 22 to look into other reasons why there may be a loss of signal. That process ends (Block 216), but further functions may be established depending on the design or function of the terrestrial station 22.

If the degradation in the signal is caused by rain fade, indicated by the "YES" from Block 212, the controller determines a mitigation action (Block 218), such as generating a signal to be sent to the satellite 24 to increase the transmit signal power from the satellite or establish an alternative communication link 26 with a back-up terrestrial station or an alternative communications link in a different frequency band. It could include switching to an alternate satellite not in the rain fade line and using the same terrestrial station. This mitigation action is communicated to the satellite (Block 220) when the degradation of the communications link is caused by the rain fade. The mitigation action is initiated at the satellite (Block 222). Sometimes the rain fade will cease and the controller 30 determines an end to the degradation of the communication link (Block 224) and the controller may generate a return-to-normal action for the satellite 24 based upon the ending of the degradation of the communications link. The terrestrial station 22 transmits that return-to-normal action as a signal to the satellite (Block 226). The process ends (Block 228) while the satellite as a return-to-normal action could lower its power back to normal, lower power transmission to an original frequency or establish an original communication path, as non-limiting examples depending on the original mitigation action.

Figure 3:
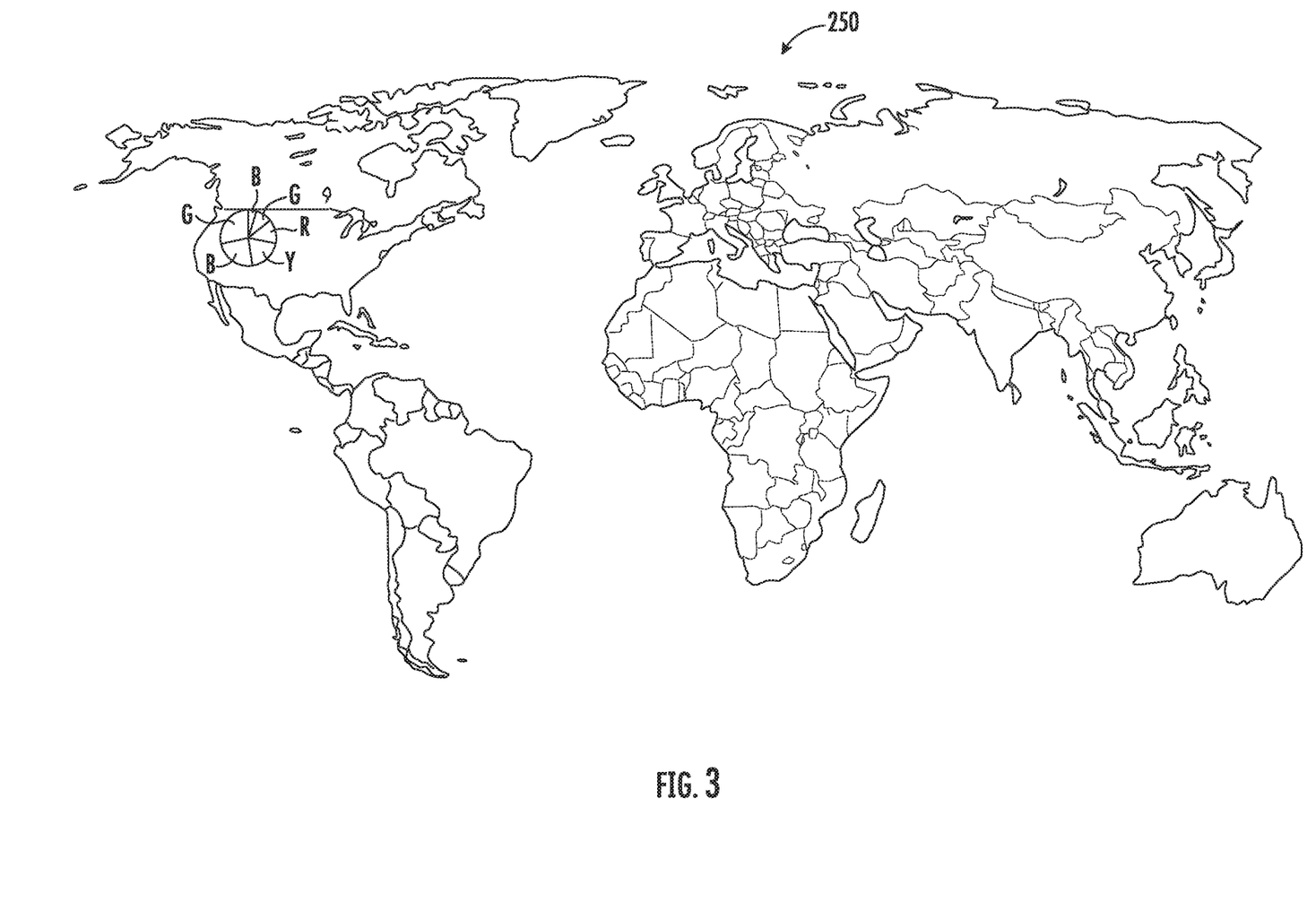
FIG. 3 is a diagrammatic view showing a mitigation action as possible alternative communication links.

Referring now to FIG. 3, there is illustrated at 250 a world map showing an area near the United States and Canadian border with a pie type chart representing a mitigation action for establishing an alternative communication link 26 with a back-up terrestrial station 22 as based upon the satellite-derived, rainfall rate and rainfall height. For example, a monitor viewed by an observer may include a color coded pie type chart or graph having colors to represent a poor to good communications link based on the geographical area and location of a terrestrial station 22 or back-up terrestrial station. For example, Green (G) could be the best communication link followed in order by Blue (B), Yellow (Y) and Red (R), with Red indicating the poorest communication link 26 in a geographical area, such as caused by the rain fade. The best communication link is Green (G), followed by Blue (B), and then Yellow (Y). Thus, the controller 30 may automatically establish an alternative communication link 26 in an area west of the existing terrestrial station indicated by the central portion of the chart and the area west corresponding to the Green (G) regional area, thus indicating the western area as having better signal reception than the eastern area as illustrated by Red (R), which is subject to greater degradation of the signal.

The satellite-derived, rainfall rate and rainfall height data may be used by the satellite communications system 20 and could be used by fixed station operators as terrestrial stations 22 to allow near real-time Equivalent Isotropically Radiated Power (EIRP) to be increased such that communications will not be interrupted and the resilient quality of service (QOS) maintained. The simple graphics example shown in FIG. 3 with the color coding of Red, Yellow, Blue and Green, and based on station latitude and longitude and an equatorial communications satellite location chart are generated. Mobile land, ship and airplane based users may use the satellite communications system 20, where an operator inputs mobile latitude and longitude and corresponding clock times of when data is or will be valid and allows the forecasts of the EIRP to be increased so no critical communications will be interrupted and the resilient quality of service maintained. Tabular data or graphics may be generated for each location.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A satellite communication system comprising:
a terrestrial station and a satellite having a communication link therebetween;
the terrestrial station comprising a controller and a transceiver cooperating therewith and configured to
determine a degradation of the communication link,
obtain satellite-derived, rainfall rate and rainfall height data,
determine a rain fade for the communication link based upon the satellite-derived, rainfall rate and rainfall height data,
determine when the degradation of the communication link is caused by the rain fade, and
determine a mitigation action for the satellite and communicate the mitigation action to the satellite when the degradation of the communication link is determined to be caused by the rain fade.

2. The satellite system of claim 1 wherein the controller is configured to generate an indication when the degradation of the communication link is not caused by the rain fade.

3. The satellite system of claim 1 wherein the controller is configured to:
determine an ending of the degradation of the communication link; and
communicate a return-to-normal action for the satellite based upon an ending of the degradation of the communication link.

4. The satellite system of claim 1 wherein the controller is configured to determine the degradation of the communication link based upon a reduced received signal strength.

5. The satellite system of claim 1 wherein the mitigation action comprises increasing a transmit power of the satellite.

6. The satellite system of claim 1 wherein the mitigation action comprises establishing an alternative communication link with a back-up terrestrial station.

7. The satellite system of claim 6 wherein the controller is configured to determine the back-up terrestrial station based upon the satellite-derived, rainfall rate and rainfall height.

8. The satellite system of claim 1 wherein the mitigation action comprises switching to an alternate satellite.

9. The satellite system of claim 1 wherein the mitigation action comprises establishing an alternative communication link in a different frequency band from the communication link.

10. The satellite system of claim 1 wherein the controller is configured to determine the rain fade using a rain fade model.

11. A terrestrial station for a satellite communication system comprising:
a controller and a transceiver cooperating therewith and configured to
determine a degradation of a communication link with a satellite,
obtain satellite-derived, rainfall rate and rainfall height data,
determine a rain fade for the communication link based upon the satellite-derived, rainfall rate and rainfall height data,
determine when the degradation of the communication link is caused by the rain fade, and
determine a mitigation action for the satellite and communicate the mitigation action to the satellite when the degradation of the communication link is determined to be caused by the rain fade.

12. The terrestrial station of claim 11 wherein the controller is configured to generate an indication when the degradation of the communication link is not caused by the rain fade.

13. The terrestrial station of claim 11 wherein the controller is configured to:
determine an ending of the degradation of the communication link; and
communicate a return-to-normal action for the satellite based upon an ending of the degradation of the communication link.

14. The terrestrial station of claim 11 wherein the controller is configured to determine the degradation of the communication link based upon a reduced received signal strength.

15. The terrestrial station of claim 11 wherein the mitigation action comprises increasing a transmit power of the satellite.

16. The terrestrial station of claim 11 wherein the mitigation action comprises establishing an alternative communication link with a back-up terrestrial station.

17. The terrestrial station of claim 16 wherein the controller is configured to determine the back-up terrestrial station based upon the satellite-derived, rainfall rate and rainfall height.

18. The terrestrial station of claim 11 wherein the mitigation action comprises establishing an alternative communication link in a different frequency band from the communication link.

19. A method for operating a satellite communication system comprising a terrestrial station and a satellite having a communication link therebetween, the terrestrial station comprising a controller and transceiver cooperating therewith, the method comprising:
operating the controller and transceiver cooperating therewith to
determine a degradation of the communication link,
obtain satellite-derived, rainfall rate and rainfall height data,
determine a rain fade for the communication link based upon the satellite-derived, rainfall rate and rainfall height data,
determine when the degradation of the communication link is caused by the rain fade, and
determine a mitigation action for the satellite and communicate the mitigation action to the satellite when the degradation of the communication link is determined to be caused by the rain fade.

20. The method of claim 19 comprising operating the controller to generate an indication when the degradation of the communication link is not caused by the rain fade.

21. The method of claim 19 comprising operating the controller to:
determine an ending of the degradation of the communication link; and
communicate a return-to-normal action for the satellite based upon an ending of the degradation of the communication link.

22. The method of claim 19 comprising operating the controller to determine the degradation of the communication link based upon a reduced received signal strength.

23. The method of claim 19 wherein the mitigation action comprises increasing a transmit power of the satellite.

24. The method of claim 19 wherein the mitigation action comprises establishing an alternative communication link with a back-up terrestrial station.

25. The method of claim 19 wherein the mitigation action comprises establishing an alternative communication link in a different frequency band from the communication link.

26. The method of claim 19 comprising operating the controller to determine the rain fade using a rain fade model.

* * * * *